(12) United States Patent
Gessner et al.

(10) Patent No.: US 6,533,826 B1
(45) Date of Patent: Mar. 18, 2003

(54) METHOD FOR PRODUCING AQUEOUS SOLUTIONS OF CATIONIC DIARYLMETHANE COLORANTS AND TRIARYLMETHANE COLORANTS

(75) Inventors: Thomas Gessner, Heidelberg (DE); Gunter-Rudolf Schröder, Mannheim (DE); Robert Reinhardt, Meckenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/762,296

(22) PCT Filed: Jul. 20, 1999

(86) PCT No.: PCT/EP99/05165

§ 371 (c)(1),
(2), (4) Date: Feb. 8, 2001

(87) PCT Pub. No.: WO00/08105

PCT Pub. Date: Feb. 17, 2000

(30) Foreign Application Priority Data

Aug. 8, 1998  (DE) .......................................... 198 35 967

(51) Int. Cl.[7] .......................... C09B 67/34; C09B 67/54

(52) U.S. Cl. .................. 8/634; 8/654; 8/657; 552/110; 552/111; 552/112; 552/113; 552/114

(58) Field of Search .............................. 8/654–657, 594, 8/598, 634; 552/110–114

(56) References Cited

U.S. PATENT DOCUMENTS

| | | | | |
|---|---|---|---|---|
| 4,390,342 | A | * | 6/1983 | Bruttel et al. |
| 5,347,022 | A | * | 9/1994 | Gessner et al. |
| 5,593,491 | A | * | 1/1997 | Karnell |
| 5,659,053 | A | * | 8/1997 | Gessner et al. |

FOREIGN PATENT DOCUMENTS

| | | |
|---|---|---|
| EP | 0 037 382 | 10/1981 |
| EP | 0 097 125 | 12/1983 |
| EP | 0 197 006 | 10/1986 |
| FR | 2 334 720 | 7/1977 |
| FR | 2 416 926 | 9/1979 |

* cited by examiner

*Primary Examiner*—Margaret Einsmann
(74) *Attorney, Agent, or Firm*—Oblon, Spivak, McClelland, Maier & Neustadt, P.C.

(57) ABSTRACT

Process for preparing aqueous solutions of cationic di- and triarylmethane dyes by the aqueous dye solution, which contains organic solvents, being concentrated by nanofiltration and optionally diluted with water.

10 Claims, No Drawings

METHOD FOR PRODUCING AQUEOUS SOLUTIONS OF CATIONIC DIARYLMETHANE COLORANTS AND TRIARYLMETHANE COLORANTS

SPECIFICATION

The present invention relates to a process for preparing aqueous solutions of cationic di- and triarylmethane dyes from the aqueous dye solutions, which contain water-soluble organic solvents.

It is common knowledge to use nanofiltration, sometimes also referred to as ultrafiltration, to concentrate dye solutions and also remove salts therefrom, as described in EP-A-0 037 382, for example. This is frequently employed in the case of azo dyes, since their synthesis involves high salt levels.

DE-A-2 805 891 describes the removal of sodium chloride from anionic dyes by diafiltration and the conversion of the anionic dyes into dyes having amines as cations.

The production of liquid forms of cationic triarylmethane dyes continues to pose a number of problems, since this class of dyes, unlike traditional azo dyes, is synthesized in the presence of water-soluble organic solvents, frequently organic acids. Organic solvents, which are subsumed under volatile organic compounds (VOCs), are unwelcome in the liquid use forms of the dyes. The removal of a water-soluble organic solvent is frequently possible only together with the water, necessitating an energy-intensive isolation of the solids, which, moreover, represents an additional thermal stress for the dye.

It is an object of the present invention to provide a more economical process for preparing aqueous solutions of cationic di- and triarylmethane dyes.

We have found that this object is achieved by a process for preparing aqueous solutions of cationic di- and triarylmethane dyes by the aqueous dye solution, which contains organic solvents, being concentrated by nanofiltration and optionally diluted with water.

The process of the present invention makes it possible to remove water-soluble organic solvents. The term "solvent" does not necessarily mean that this organic substance was a solvent for the dye or for a precursor thereof. It may similarly be the cosolvent or, in the case of carboxylic acids for example, be formed from the counterion of the dye, and rather encompasses the group subsumed under the term VOC.

By water-soluble are meant solvents whose solubility in water is not less than 50 g/kg.

Examples are:

carboxylic acids such as formic acid, acetic acid, propionic acid and lactic acid alkanols such as methanol, ethanol, n-propanol, isopropanol, ethylene glycol, propylene glycol and butylglycol ethers such as tetrahydrofuran, dioxane, dimethoxyethane or diethylene glycol dimethyl ether.

The process of the present invention may be used to remove just one solvent or mixtures of two or more solvents.

The process of the present invention makes it possible to prepare aqueous solutions of cationic di- and triarylmethane dyes and is not limited to specific substitution patterns.

Cationic dyes are to be understood as meaning in particular dyes of the general formula I (I)

where $R^1$, $R^2$, $R^3$ and $R^4$ are independently $C_1$–$C_8$-alkyl with or without substitution and with or without interruption by from 1 to 3 oxygen atoms in ether function, phenyl or $C_1$–$C_4$-alkylphenyl, $R^5$ and $R^6$ are independently hydrogen or methyl, X is hydrogen, substituted or unsubstituted phenyl or substituted or unsubstituted naphthyl, and $An^\ominus$ is the equivalent of an anion, which are obtained by oxidizing the corresponding leuco compound of the formula II (II)

These dyes may have both straight-chain and branched alkyl chains, which may further be substituted, for example by hydroxyl, chlorine, cyano, phenyl or hydroxysulfonylphenyl.

Naphthyl groups may for example be substituted by amino, mono- or di($C_1$–$C_4$)alkylamino, mono- or diphenylamino or hydroxysulfonyl.

Phenyl groups in the formula I may be substituted for example by methyl, chlorine, amino, mono- or di($C_1$–$C_4$) alkylamino, mono- or diphenylamino, hydroxyl, $C_1$–$C_4$-alkoxy or hydroxysulfonyl.

In substituted alkyl, phenyl or naphthyl groups, the number of substituents is in general from one to three.

Suitable anions include for example fluoride, chloride, bromide, iodide, hydrogensulfate, sulfate, tetrafluoroborate, formate, acetate, propionate, mono-, di- or trichloroacetate, lactate, methoxyacetate, citrate, succinate, methylsulfonate, benzenesulfonate or 2- or 4-methylbenzenesulfonate.

When the dyes of the formula I have hydroxysulfonyl radicals and are present in the salt form, suitable counterions are metal or ammonium ions. Metal ions are especially lithium, sodium or potassium ions. Ammonium ions for the purposes of the present invention are either unsubstituted or substituted ammonium cations.

Dyes of the formula I are common knowledge. Examples are:

malachite green (C.I. 42000 Basic Green 4), crystal violet (C.I. 42555 Basic Violet 3), methyl violet (C.I. 42535 Basic Violet 1), Michler's Hydrol Blue, brilliant green (C.I. 42040 Basic Green 1), Victoria Pure Blue (C.I. 42595 Basic Blue 7), ethyl violet (C.I. 42600 Basic Violet 4) and Victoria Blue B (C.I. 44045 Basic Blue 26).

Membranes useful for the process of the present invention are conventional membranes which are also useful for removing salts. These membranes are organic or inorganic porous membranes whose pores are from 1 to 500 Å in diameter. They are advantageously made of organic material which contains ionic groups. Of particular advantage are membranes having a molecular weight cut-off level of from 200 to 1000.

To force the permeate through the membrane, the pressures employed range from 5 to 50 bar, preferably from 15 to 25 bar. The membranes generally have permeate flux rates of up to 150 l/hm$^2$.

Examples of suitable membrane materials are polysulfone, polyether sulfone, sintered metal, cellulose, cellulose acetate, polyamide, aramid, polyether, polyether sulfone, polytetrafluoroethylene, polyvinylidene fluoride or ceramics.

The membranes can have various forms, for example plate form, sheet form, tube form, pocket form, cone form or the form of hollow fibers. To resist high pressures, the membranes may of course be supported by wire screens or foraminous plates. Within the abovementioned range, the pore size may be varied by various heat treatments and likewise be optimized to the particular intended use.

Such membranes are commercially available and described in EP-A-0 037 382, for example. Such membrane separation processes, furthermore, have been described in detail, for example in H. Stratmann, H. Chmiel, Chem.-Ing.-Techn. 57 (1985) 581–596 and W. Pusch, A. Walch, Angew. Chem. 94 (1992) 670–695.

If desired or necessary, the dye solution is diluted with water and then concentrated by nanofiltration through removal of the permeate, which is a mixture of water and the water-soluble organic solvent. The amount of water to be added for dilution is relatively freely chooseable and merely limited by the solubility of the dye. The degree of dilution must not be so small as to cause the dye to precipitate during the nanofiltration. In general, the dye solution is diluted to a dye content of from 5 to 30% by weight. The nanofiltration removes up to 100 l of liquid per m$^2$ of filter area per hour, depending on membrane type. This permeate is preferably replaced with water. The replacement of the permeate with water may take place both a little at a time and continuously.

In a preferred variant, which involves the dye solution being recirculated and the permeate being continuously replaced with water, the amount of water-soluble organic solvents is reduced to 1% by weight of their original level while the total amount of permeate removed is equal to 1–10 times the amount of recirculating dye solution.

The process of the present invention is particularly useful for removing carboxylic acids, especially acetic acid.

The process of the present invention is particularly effective at pH $\leq 4$, preferably pH 1–3. More particularly, a pH $\leq 3$ is advantageous for removing carboxylic acids.

Water-soluble organic solvents are frequently present in the reaction mixture because of the nature of the dye synthesis. For example, the dyes are synthesized with oxygen or hydrogen peroxide in the presence of a carboxylic acid such as acetic acid and a catalyst and therefore contain the carboxylic acid. In a preferred variant of the process, the reaction mixtures obtained by oxidation are, without intermediary isolation of the dye, admixed with a stronger acid than the carboxylic acid to be removed, the mixture is optionally clarified, optionally diluted with water, and nanofiltered, the last two measures being possibly repeated one or more times. The clarification is advantageously carried out after the diluting step.

A stronger acid has a lower $pK_a$. Strong acids include both inorganic and organic acids. Preference is given to using acids whose anions form readily water-soluble salts with triarylmethane dyes, since concentrated dye solutions are usually desired.

Stronger acids useful for the removal of carboxylic acids include for example sulfuric acid, hydrochloric acid, methanesulfonic acid, orthophosphoric acid and amidosulfonic acid. The acid is generally used in an at least equinormal amount to the dye. If the pH of $\leq 3$ was not reached, it is advantageous to add further acid.

The process of the present invention makes it possible to use as-synthesized dye solutions and to remove water-soluble organic solvents from them without costly intermediary isolation of the dye. The aqueous dye solutions thus obtained are stable and directly useful as liquid dyes.

The examples hereinbelow illustrate the process of the present invention.

The tests described in Examples 1–6 were carried out with the aid of a cross flow filtration unit equipped with a stack plate module. The module was fitted with 10 flat sheet membranes and had an effective filter area of 0.044 m$^2$ in total. The requisite operating pressure and the cross flow was generated using a piston membrane pump. A pressure control valve was used to set the pressure drop across the membrane to 20 bar.

EXAMPLE 1

2000 g of a 42% strength by weight aqueous acetic acid solution of malachite green acetate having an acetic acid content of 53% by weight were diluted with 6000 g of water and then clarified through a fluted filter. The pH of this solution was 3.0. The solution was adjusted to pH 2.2 with concentrated sulfuric acid and nanofiltered through an Osmonics MX 07 membrane, the permeate being continuously replaced with water. In total, 102 l of permeate were removed. The permeate flux rate rose to 41 l/hm$^2$ in the course of the first 5 hours (membrane conditioning). As the nanofiltration progressed, the pH rose to pH 3. At the same time, the permeate flux rate decreased to 18 l/hm$^2$. On adjusting the pH to 2, a maximum permeate flux rate on 52 l/hm$^2$ was observed again. The dye solution was then concentrated to a dye content of 33.4% by weight by further nanofiltration without the liquid being replenished. The acetic acid content was 0.32% by weight.

The following tests were carried out similarly to Example 1 as per Table 1. All the tests started with 2000 g of a 42% strength by weight aqueous acetic acid solution of malachite green acetate containing 53% by weight of acetic acid. xg of water was added. The pH was set with various acids. In this way, the corresponding salts of the dye were produced. y l of the permeate were separated off, and replaced with water, before the solution was concentrated to a dye content of c [% by weight].

TABLE 1

| Ex. | x [g] | Acid added | pH | Permeate [l] | c [% by wt.] | Maximum flux rate l/hm$^2$ | Residual level of acetic acid [% by wt.] |
|---|---|---|---|---|---|---|---|
| 2 | 6000 | methanesulfonic acid | 2.2 | 45 | 32.0 | 27 | 0.19 |

TABLE 1-continued

| Ex. | x [g] | Acid added | pH | Permeate [1] | c [% by wt.] | Maximum flux rate l/hm² | Residual level of acetic acid [% by wt.] |
|---|---|---|---|---|---|---|---|
| 3 | 6000 | ortho-phosphoric acid | 2.3 | 43 | 30.8 | 22 | 0.21 |
| 4 | 6000 | amidosulfonic acid | 2.3 | 40 | 34.9 | 18 | 0.22 |
| 5 | 2000 | sulfuric acid | 2.5 | 35 | 33.0 | 8 | 0.16 |

Examples 2–5 were carried out with the same membrane. This led from test to test to an asymptotic decrease in the flux rate to an equilibrium flux rate of about 18 l/hm². Repeating Example 2 after a membrane operating life of about 180 h produced a maximum flux rate of 19 l/hm² at pH 2.1.

EXAMPLE 6

950 g of a solution comprising 33% by weight of the dye of the formula

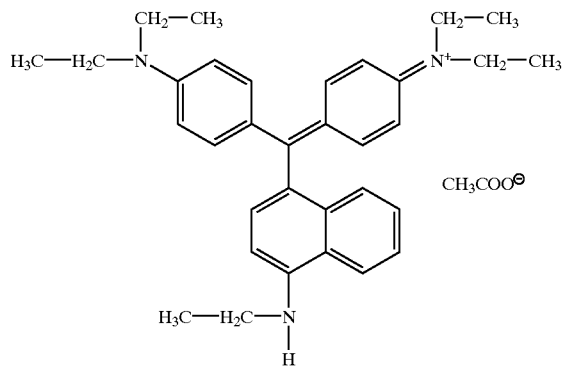

in 18% by weight of acetic acid and 44% by weight of butylglycol were diluted with 5.74 l of water and freed from insoluble by-products by filtration. This dye solution was then nanofiltered through MPF 21 membranes (from Weizmann), the liquid removed being replaced with water. In total, 31 l of water were added. During the nanofiltration, the pH rose to 5.0, and the permeate flux decreased from an initial 34 l/hm² to 7 l/hm². By adding acetic acid, the pH was corrected to 3.5, which improved the permeate flux to about 30 l/hm². Finally, the dye solution was concentrated to a volume of about 5 l and a dye content of 6.0% by weight. The butylglycol content of this solution was 0.19% and the acetic acid/acetate content 3.2%.

The following tests were carried out in a filtration unit in which a multistage centrifugal pump was used to generate pressure and cross flow.

EXAMPLE 7

200 kg of dye solution (41.7% by weight of malachite green acetate, 52.6% by weight of acetic acid) were diluted with 400 kg of water and adjusted to pH 2 with 14.5 kg of concentrated sulfuric acid. After filtration, the aqueous dye solution (17.1% by weight of acetic acid/acetate, pH 2) was nanofiltered at 30° C. through a wound module (membrane MX07 from Osmonics, membrane surface area about 1 m²). A mean module operating pressure of 22–25 bar and a concentrate flux of 1.9–3.5 m³/h yielded a permeate flux of about 27–30 l/hm². Removed permeate was replaced with demineralized water during the nanofiltration; the dye solution was maintained at pH 1.9–2.4 by addition of concentrated sulfuric acid (3.4 kg in total). After 58 h of nanofiltration, the acetic acid/acetate content was 1.3% by weight. In total, 1932 kg of permeate were obtained. The aqueous dye solution was then concentrated over 24 h until the permeate flux had dropped to 3.0 l/hm². This yielded a further 484 kg of permeate. The acetic acid/acetate content of the concentrated aqueous malachite green solution (pH 2.6) was 2.0% by weight; the gas space of the dye container was found to contain 4.3 mg of acetic acid per m³ at 25° C. (corresponding to 0.4 mg of carbon/m³ at 0° C.). The 120 kg of dye solution thus obtained contained 80 kg of malachite green sulfate and 1.6 kg of acetic acid.

EXAMPLE 8

100 kg of dye solution (41.7% by weight of malachite green acetate, 52.6% by weight of acetic acid) were diluted with 600 kg of water and adjusted to pH 2 with 8.0 kg of concentrated sulfuric acid. After filtration, the aqueous dye solution, pH 2, (9.9% by weight of acetic acid/acetate in the solution; in the gas space: 263 mg of acetic acid per m³ at 30° C. corresponding to 18.8 mg of carbon/m³ at 0° C.) was nanofiltered at 30° C. through a wound module (membrane MX07 from Osmonics, membrane surface area about 1 m²). A mean module operating pressure of 22 bar and a concentrate flux of 3.4–3.7 m³/h yielded a permeate flux of about 28–36 /hm². Removed permeate was replaced with demineralized water during the nanofiltration; the dye solution was maintained at pH 2.0–2.6 by addition of concentrated sulfuric acid (1.6 kg in total). After 48 h of nanofiltration, the acetic acid/acetate content was 0.66% by weight (in the gas space: 30.6 mg of acetic acid per m³ at 30° C. corresponding to 2.2 mg of carbon/m³ at 0° C.). In total, 1886 kg of permeate were obtained. The aqueous dye solution was then concentrated over 24 h until the permeate flux had dropped to 1.5 l/hm². This yielded 555 kg of permeate. The acetic acid/acetate content of the concentrated aqueous malachite green solution (pH 2.6) was 2.0% by weight; the gas space of the dye container was found to contain 14.4 mg of acetic acid per m³ at 25° C. (corresponding to 1.3 mg of carbon/m³ at 0° C.). The 145 kg of dye solution obtained in this way contained 40 kg of malachite green sulfate and 2.9 kg of acetic acid.

EXAMPLE 9

100 kg of dye solution (45.8 kg of crystal violet acetate, 32.9% by weight of acetic acid) were diluted with 400 kg of water and adjusted to pH 2.2 with 10.8 kg of concentrated sulfuric acid. After filtration, the aqueous dye solution (pH 2.2, 7.2% by weight of acetic acid/acetate in the solution; in the gas space: 1780 mg of acetic acid per m³ at 40° C. corresponding to 78.5 mg of carbon/m³ at 0° C.) was nanofiltered at 40° C. through a tubular module (membrane MPT-36 from Weizmann). A mean module operating pressure of 27 bar and a concentrate flux of 1.0–1.1 m³/h yielded a permeate flux of about 31–40 l/hm². Removed permeate was replaced with demineralized water during the nanofiltration. After 38 h of nanofiltration, the acetic acid/acetate content was 2.1% by weight (in the gas space: 510 mg of acetic acid per m³ at 40° C. corresponding to 22.5 mg of carbon/m³ at 0° C.). In total, 1032 kg of permeate were obtained. The aqueous dye solution was then concentrated over 31 h until the permeate flux had dropped to 4.8 l/hm².

This yielded 392 kg of permeate. The acetic acid/acetate content of the concentrated aqueous crystal violet solution (pH 2.8) was 2.6% by weight; the gas space of the dye container was found to contain 230 mg of acetic acid per m$^3$ at 40° C. (corresponding to 10.2 mg of carbon/m$^3$ at 0° C.). The 108 kg of dye solution thus obtained contained 40 kg of crystal violet sulfate and 2.8 kg of acetic acid.

We claim:

1. A process for removing carboxylic acid from an aqueous dye solution comprising:

mixing the aqueous dye solution with a stronger acid;

optionally diluting the aqueous dye solution with water; and concentrating the dye by nanofiltration at pH≦3;

wherein the aqueous dye solution comprises a cationic di- or triarylmethane dye, a carboxylic acid, and water, and the stronger acid has a pK$_a$ which is lower than that of the carboxylic acid.

2. The process of claim 1, wherein the carboxylic acid is acetic acid.

3. The process of claim 1, further comprising optionally clarifying the aqueous dye solution, wherein the cationic di- or triarylmethane dye has been synthesized by oxidation, and said mixing is carried out without intermediate isolation of the cationic di- or triarylmethane dye.

4. The process of claim 1, wherein the cationic dye has a structure of formula

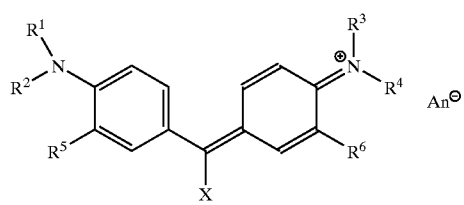

(I)

wherein R$^1$, R$^2$, R$^3$ and R$^4$ are independently substituted or unsubstituted C$_1$–C$_8$-alkyl groups which may contain 1 to 3 ether oxygen atoms, phenyl, or C$_1$–C$_4$-alkylphenyl; R$^5$ and R$^6$ are independently hydrogen or methyl; X is hydrogen, substituted or unsubstituted phenyl, substituted or unsubstituted naphthyl; and An is an anion.

5. The process of claim 1, wherein the cationic dye is a dye selected from the group consisting of malachite green, crystal violet, methyl violet, Michler's Hydrol Blue, brilliant green, Victoria Pure Blue, ethyl violet, and Victoria Blue B.

6. The process of claim 1, wherein said nanofiltration is carried out at a pressure of from 15 to 25 bar, with a membrane having a permeate flux of up to 150 l/hm$^2$.

7. The process of claim 6, wherein said membrane comprises polysulfone, polyether sulfone, sintered metal, cellulose, cellulose acetate, polyamide, aramid, polyether, polytetrafluoroethylene, polyvinylidene fluoride, or a ceramic.

8. The process of claim 6, wherein the membrane has a form of a plate, a sheet, a tube, a pocket, a cone, or a hollow fiber.

9. The process of claim 1, wherein the aqueous dye solution is diluted with water to a dye content of from 5 to 30% by weight dye.

10. The process of claim 1, wherein the stronger acid is selected from the group consisting of sulfuric acid, hydrochloric acid, methanesulfonic acid, orthophosphoric acid, and amidosulfonic acid.

* * * * *